(12) United States Patent
Lee (10) Patent No.: US 9,367,030 B2
(45) Date of Patent: Jun. 14, 2016

(54) ROTARY CAM APPARATUS AND ELECTROPHOTOGRAPHIC IMAGE FORMING APPARATUS ADOPTING THE SAME

(71) Applicant: SAMSUNG ELECTRONICS CO., LTD., Suwon-si, Gyeonggi-do (KR)

(72) Inventor: Young-ju Lee, Incheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 159 days.

(21) Appl. No.: 13/895,750

(22) Filed: May 16, 2013

(65) Prior Publication Data

US 2014/0072325 A1    Mar. 13, 2014

Related U.S. Application Data

(60) Provisional application No. 61/699,471, filed on Sep. 11, 2012.

(30) Foreign Application Priority Data

Nov. 19, 2012  (KR) .................. 10-2012-0131113

(51) Int. Cl.
| | |
|---|---|
| G03G 15/20 | (2006.01) |
| G03G 21/16 | (2006.01) |
| F16H 53/02 | (2006.01) |
| G03G 15/16 | (2006.01) |
| G03G 21/00 | (2006.01) |

(52) U.S. Cl.
CPC ............ *G03G 21/168* (2013.01); *F16H 53/025* (2013.01); *G03G 15/161* (2013.01); *G03G 21/0029* (2013.01)

(58) Field of Classification Search
CPC ........................... G03G 21/168; G03G 15/161
USPC ........................................... 399/101, 123, 345
See application file for complete search history.

(56) References Cited

U.S. PATENT DOCUMENTS

| | | | |
|---|---|---|---|
| 7,428,390 B2* | 9/2008 | Ando | G03G 15/2039 399/328 |
| 8,170,435 B2* | 5/2012 | Ueno | G03G 15/2064 399/67 |
| 8,375,904 B2* | 2/2013 | Gustafson | F01L 1/08 123/348 |
| 2006/0216056 A1* | 9/2006 | Okabe | 399/101 |
| 2009/0102108 A1 | 4/2009 | Kruse | |

FOREIGN PATENT DOCUMENTS

JP          03168678 A  *  7/1991  ............. G03G 21/00

* cited by examiner

*Primary Examiner* — David Gray
*Assistant Examiner* — Andrew V Do
(74) *Attorney, Agent, or Firm* — Staas & Halsey LLP (57) ABSTRACT

A rotary cam apparatus including an operation member including a contact portion is provided. The rotary cam includes a cam profile contacting the contact portion to move the operation member, and an elastic member applying an elastic force to the operation member in a direction in which the contact portion contacts the cam profile. The cam profile includes a first cam line separated by a first distance from a rotating center of the rotary cam, a second cam line separated by a shorter second distance from the rotating center, a first conversion line connected to the first cam line from the second cam line, and a second conversion line connected to the second cam line from the first cam line including one or more straight connection lines separated by a distance greater than the second distance and less than the first distance from the rotating center.

8 Claims, 9 Drawing Sheets

ROTARY CAM APPARATUS AND ELECTROPHOTOGRAPHIC IMAGE FORMING APPARATUS ADOPTING THE SAME

CROSS-REFERENCE TO RELATED APPLICATIONS

This application is related to, and claims priority to, Korean Patent Application No. 10-2012-0131113, filed on Nov. 19, 2012, in the Korean Intellectual Property Office, and US Provisional Application No. 61/699,471, filed on Sep. 11, 2012, in the United States Patent and Trademark Office, the disclosures of which are incorporated herein in their entirety by reference.

BACKGROUND

1. Field

The present invention relates to a rotary cam apparatus capable of moving an operation member so as to move an object to a desired location and return the object to an original location, and an electrophotographic image forming apparatus adopting the rotary cam apparatus.

2. Description of the Related Art

A rotary cam apparatus may move an operation member by using a rotary cam so as to move an object to a desired location and return the object back to an original location. An elastic force may be directly or indirectly applied to the operation member in a direction of contacting a profile of the rotary cam. The operation member may be moved to an opposite direction of the elastic force based on a rotating center of the rotary cam according to a rotating phase of the cam profile of the rotary cam to reach a separation location, and then, may approach the rotary cam again by the elastic force to reach an adjacent location. The operation member may repeatedly perform the operations.

If a rotating speed of the rotary cam is slow when the operation member approaches the rotary cam due to the elastic force, the elastic force may be gradually reduced and the operation member smoothly approaches the rotary cam. However, if the rotating speed of the rotary cam is fast, shocks generated due to a rapid change of the elastic force may be applied to the operation member and the object. If a shock is repeatedly applied, the rotary cam apparatus and a driving apparatus including the rotary cam apparatus may be damaged and may generate noise.

In a case of an electrophotographic image forming apparatus including an intermediate transfer member, a rotary cam apparatus for contacting/separating a cleaning member for cleaning the intermediate transfer member on/from the intermediate transfer member may be used. An operating shock of the rotary cam apparatus may generate noise and damage the electrophotographic image forming apparatus.

SUMMARY

Additional aspects and/or advantages will be set forth in part in the description which follows and, in part, will be apparent from the description, or may be learned by practice of the invention.

The present invention provides a rotary cam apparatus capable of distributing operating shock of a rotary cam, and an electrophotographic image forming apparatus including the rotary cam apparatus.

According to an aspect of the present invention, a rotary cam apparatus is provided including an operation member including a contact portion, a rotary cam including a cam profile contacting the contact portion of the operation member to move the operation member, and an elastic member applying an elastic force to the operation member in a direction in which the contact portion contacts the cam profile, wherein the cam profile includes a first cam line separated by a first distance from a rotating center of the rotary cam, a second cam line separated by a second distance that is shorter than the first distance from the rotating center, a first conversion line that is connected to the first cam line from the second cam line, and a second conversion line that is connected to the second cam line from the first cam line, the second conversion line comprising one or more connection lines of straight line types, which are separated by a distance that is greater than the second distance and less than the first distance from the rotating center.

The second cam line may be a straight line.

The rotary cam apparatus may further include a stopper for stopping the operation member before the contact portion contacts the second cam line.

If there is a plurality of the connection lines, distances from the rotating center to the connection lines may be reduced from the first cam line toward the second cam line.

The first conversion line may be a curve.

According to an aspect of the present invention, an electrophotographic image forming apparatus for printing images on a recording medium by an electrophotographic method is provided, the apparatus including a transfer unit for transferring a toner image to the recording medium via an intermediate transfer member, and a rotary cam apparatus for moving a cleaning member that removes waste toner on the intermediate transfer member to a cleaning location and an avoidance location, where the cleaning member contacts/is separated from the intermediate transfer member.

The rotary cam apparatus may include an operation member including a contact portion, a rotary cam including a cam profile contacting the contact portion of the operation member to move the operation member; and an elastic member applying an elastic force to the operation member in a direction in which the contact portion contacts the cam profile.

The cam profile may include a first cam line separated by a first distance from a rotating center of the rotary cam, a second cam line separated by a second distance that is shorter than the first distance from the rotating center; a first conversion line that is connected to the first cam line from the second cam line, and a second conversion line that is connected to the second cam line from the first cam line, and comprising one or more connection lines of straight line types, which are separated by a distance that is greater than the second distance and less than the first distance from the rotating center.

The second cam line may be a straight line.

The elastic member may apply an elastic force to the operation member in a direction in which the contact portion contacts the cam profile.

The first conversion line may allow the operation member to move in a direction opposite to the elastic force and the second conversion line allows the operation member to move in a direction in which the elastic force is applied.

The apparatus may further include a supporting arm supporting the cleaning member and moving to the cleaning location and the avoidance location, wherein the operation member may be connected to the supporting arm.

The apparatus may further include a stopper for stopping the operation member before the contact portion contacts the second cam line.

The stopper may be disposed on the frame on which the intermediate transfer member is supported.

The apparatus may further include: a supporting arm for supporting the cleaning member and installed on the frame to be movable to the cleaning location and the avoidance location, wherein the operation member may be connected to the supporting arm, and the stopper contacts the supporting arm to stop the operation member.

If there is a plurality of the connection lines, distances from the rotating center to the connection lines may decrease from the first cam line toward the second cam line.

The first conversion line may be a curve.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

A rotary cam apparatus and an electrophotographic image forming apparatus including the rotary cam apparatus according to embodiments of the present invention are described in detail with reference accompanying drawings.

Figure 1:
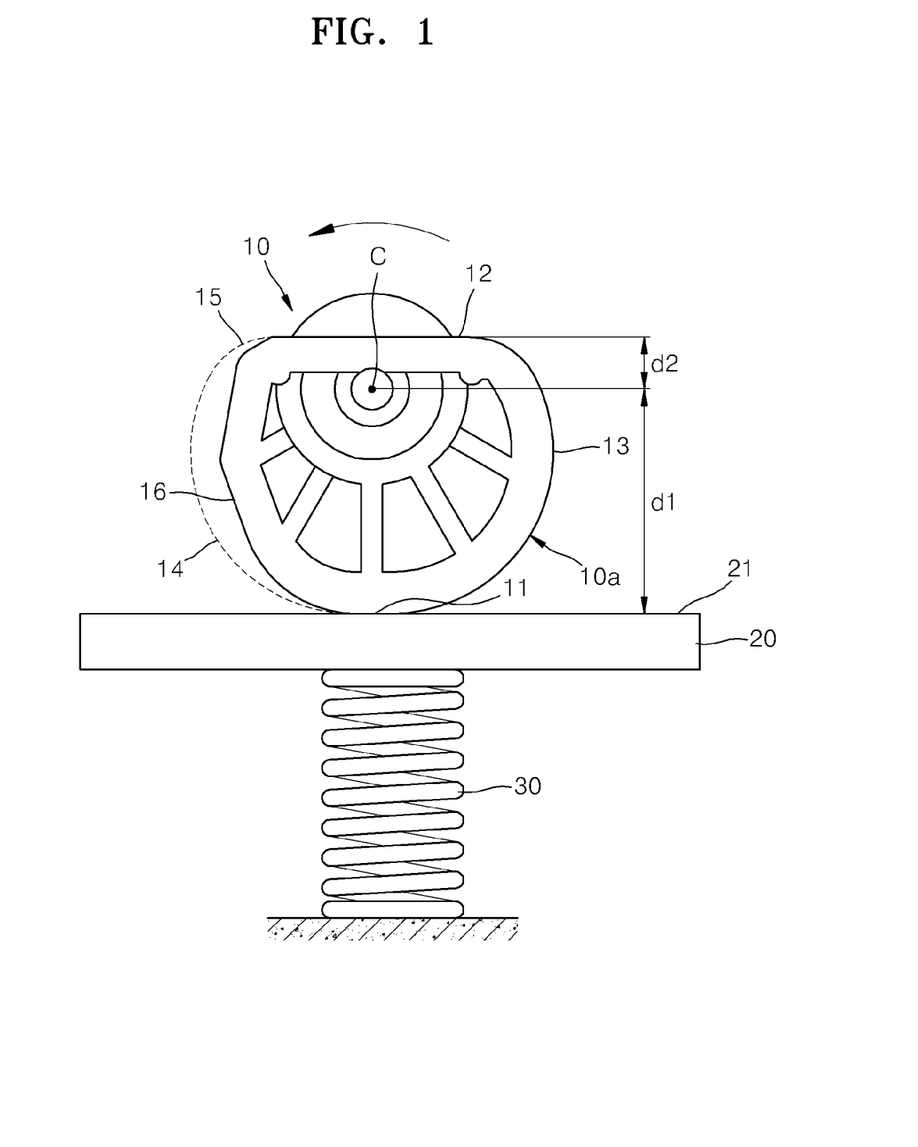
FIG. 1 illustrates a rotary cam apparatus according to an embodiment of the present invention, wherein an operation member is located at a separation location.
Figure 2:
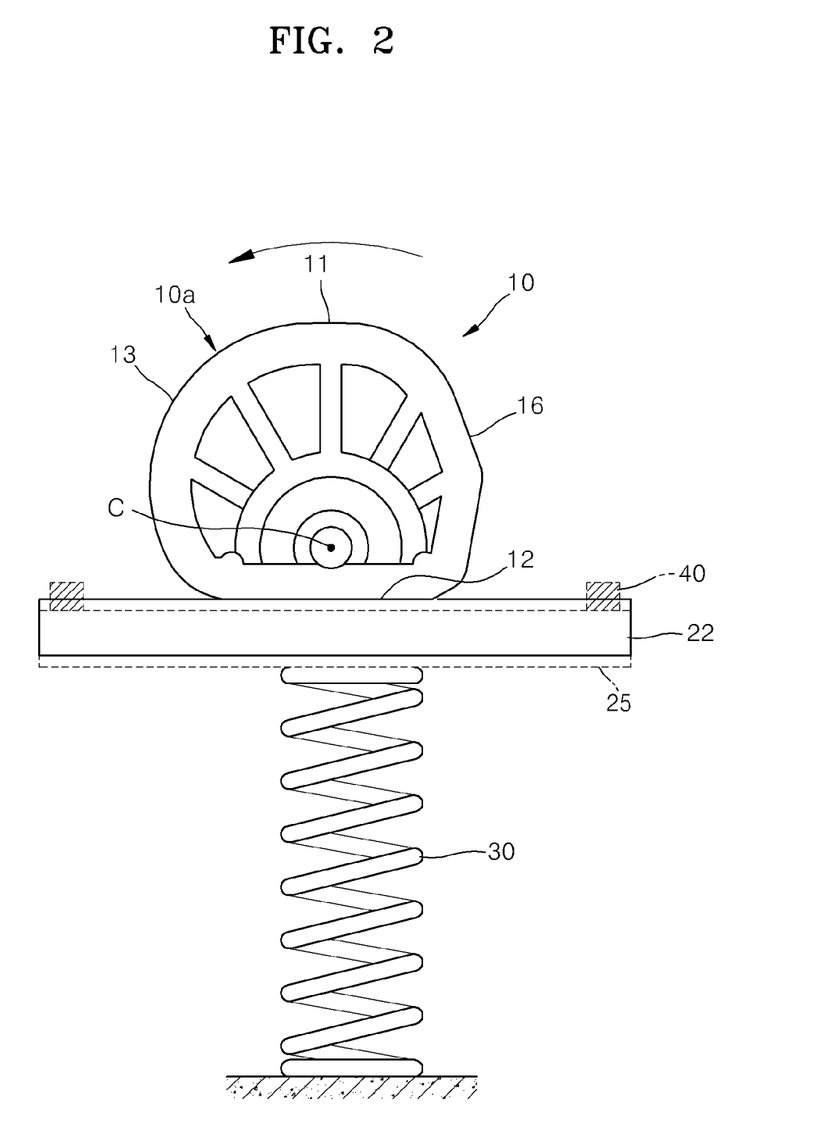
FIG. 2 illustrates a rotary cam apparatus according to an embodiment of the present invention, wherein the operation member is located at an approaching location.

FIGS. 1 and 2 illustrate a rotary cam apparatus according to an embodiment of the present invention. Referring to FIGS. 1 and 2, the rotary cam apparatus includes a rotary cam 10, an operation member 20 driven by the rotary cam 10, and an elastic member 30.

The rotary cam 10 may be rotated based on a rotating center C by a driving unit (not shown). The rotary cam 10 includes a cam profile 10a (e.g., a shape of cam that comes in contact with a contact portion). The cam profile 10a includes a first cam line 11 separated by a first distance d1 from the rotating center C, and a second cam line 12 separated by a second distance d2 that is shorter than the first distance d1 from the rotating center C. The cam profile 10a may include a first conversion line 13 that is connected to the first cam line 11 from the second cam line 12, and a second conversion line 16 that is connected to the second cam line 12 from the first cam line 11. The operation member 20 includes a contact portion 21 contacting the cam profile 10a. The elastic member 30 may apply an elastic force to the operation member 20 in a direction in which the contact portion 21 contacts the cam profile 10a. The elastic member 30 may be a compressive coil spring; however, the present invention is not limited thereto. When the operation member 20 operates an object (not shown), the elastic member 30 may apply the elastic force indirectly to the object so that the contact portion 21 of the operation member 20 contacts the cam profile 10a.

When the rotary cam 10 rotates, the first cam line 11 and the second cam line 12 may sequentially face, and contact, the contact portion 21 of the operation member 20. As illustrated in FIG. 1, when the first cam line 11 contacts the contact portion 21, the operation member 20 is moved to an opposite direction to that of an elastic force of the elastic member 30, that is, in a direction away from the rotating center C, and located at a separation location. For example, when the rotary cam 10 is rotated in a counter-clockwise direction in FIG. 1 and the second cam line 12 contacts the contact portion 21, the operation member 20 approaches the rotating center C due to the elastic force of the elastic member 30. As denoted by solid lines 22 in FIG. 2, the operation member 20 is located at an adjacent location. As denoted by dashed lines 25 in FIG. 2, if there is a stopper 40, the operation member 20 may be located at a location separated from the second cam line 12 because the contact portion 21 contacts the stopper 40 before contacting the second cam line 12. When the rotary cam 10 is continuously rotated in a counter-clockwise direction, the first cam line 11 contacts the contact portion 21 again, thereby moving the operation member 20 to the separation location. According to the rotation of the rotary cam 10, the operation member 20 may repeatedly reciprocate between the separation location and the approaching location.

When the operation member 20 moves from the approaching location to the separation location, the operation member 20 is moved in a direction opposite to the direction in which the elastic force of the elastic member 30 is applied. Therefore, the first conversion line 13 that is connected to the first cam line 11 from the second cam line 12 may be formed as a curve, a curvature radius of which may be smoothly changed based on the rotating center C, for example, a curvature radius of which is gradually increased from the second cam line 12 toward the first cam line 11. Thus, the operation member 20 may be moved smoothly from the approaching location to the separation location. Even when the rotating speed of the rotary cam 10 increases, sudden movements of the operation member 20 are reduced during moving from the approaching location to the separation location, and the elastic member 30 absorbs the shock. Thus, the shock transmitted to the operation member 20 is reduced.

When the operation member 20 moves from the separation location to the approaching location, the operation member 20 is moved by the elastic force of the elastic member 30. As illustrated in FIG. 1 by dashed lines of a curve 14, a curvature radius of which is gradually reduced from the first cam line 11 to the second cam line 12, may be formed between the first and second cam lines 11 and 12. The second cam line 12 may be a straight line so that the operation member 20 may be stably located at the approaching location. To reduce a size of the rotary cam 10, the second cam line 12 may be located as close to the rotating center C as possible. The second cam line 12 requires an appropriate length to stably determine the location of the operation member 20 at the approaching location. The curvature radius may be rapidly changed at a boundary portion 15 where the curve 14 is changed to the straight type second cam line 12. The operation member 20 may quickly approaches the second cam line 12 or the stopper 40, and then, collide with the second cam line 12 or the stopper 40. If such a shock repeatedly occurs, the rotary cam 10, the operation member 20, and the stopper 40 may be damaged or break. A shock force that is proportional to the change of the curvature radius may be applied to the operation member 20. The shock force denotes a variation amount of the elastic force applied by the elastic member 30 to the operation member 20. The shock force may increase when the rotating speed of the rotary cam 10 increases. The shock force may be largest when the rotating speed of the rotary cam 10 is so fast that the curve 14 may not perform as an effective cam profile 10a. For example, if the elastic force of the elastic member 30 linearly changes with respect to a displacement of the elastic member 30 and an elastic coefficient is k, the largest value of the shock force may be defined as Fmax=k(d1−d2).

As it may be difficult to avoid the above-described shock with the rotary cam 10 including the second cam line 12 having a planar shape, a method of reducing the shock force as much as possible is necessary. The rotary cam apparatus of an exemplary embodiment of the present invention distributes the shock occurring when the rotary cam 10 is changed from a separation location to an approaching location for a plurality of times to reduce an absolute value of the shock force applied to the rotary cam apparatus.

Figure 3:
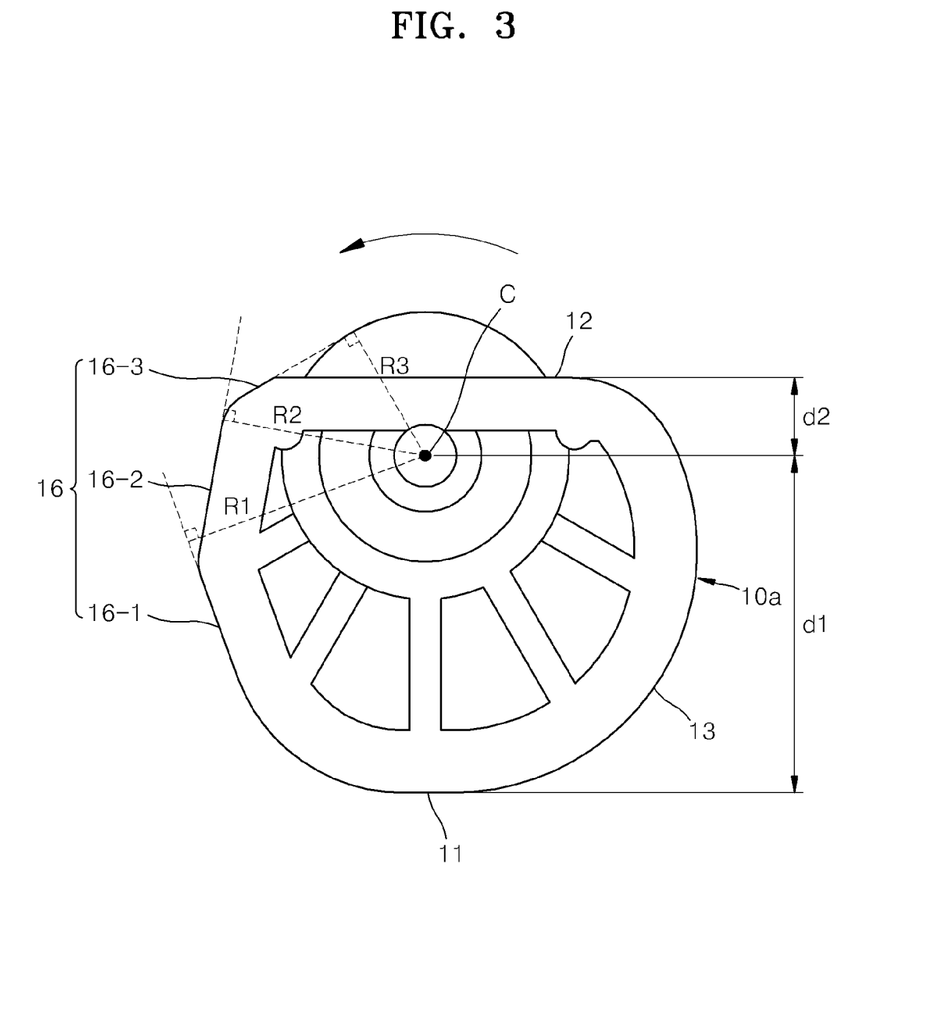
FIG. 3 illustrates connecting lines of an exemplary embodiment.

The second conversion line 16 that is connected to the second cam line 12 from the first cam line 11 may have one or more straight connecting lines. FIG. 3 illustrates an exemplary second conversion line 16 in detail. Referring to FIG. 3, the second conversion line 16 includes three straight connection lines 16-1, 16-2, and 16-3. Distances R1, R2, and R3 from the rotating center C to the three connection lines 16-1, 16-2, and 16-3 are reduced while approaching the second cam line 12. That is, the distances R1, R2, and R3 satisfy an inequality of d1>R1>R2>R3>d2.

Figure 4A:
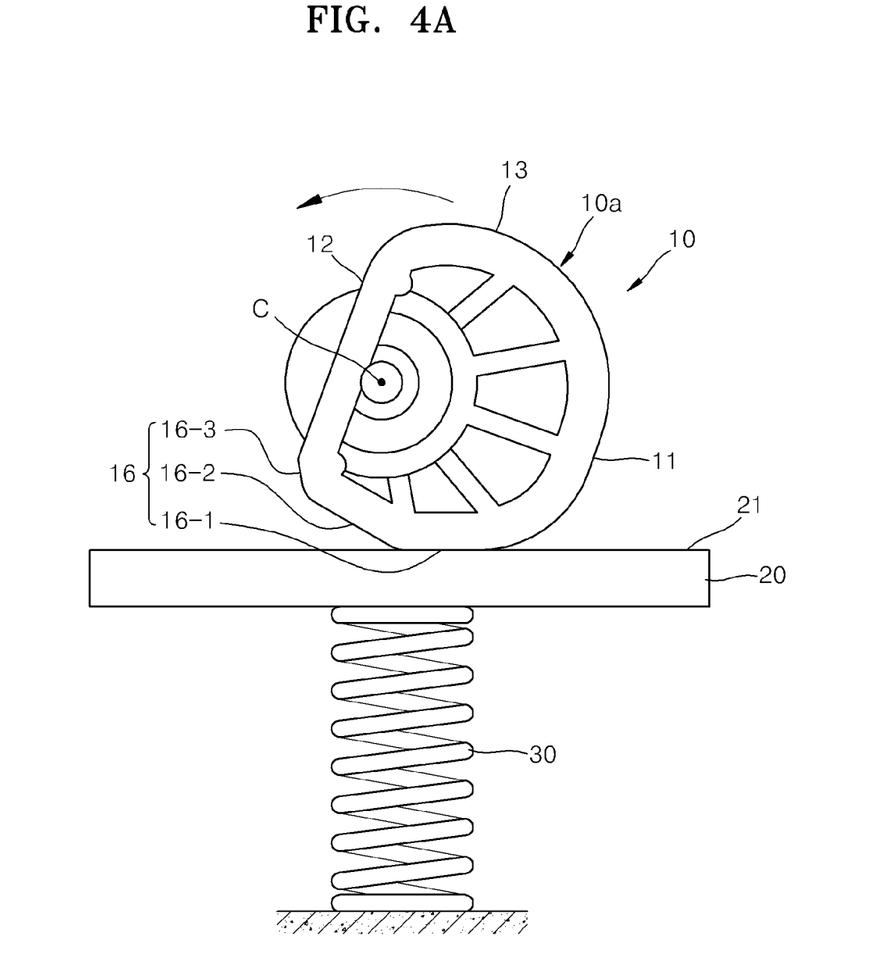
FIGS. 4A through 4C illustrate exemplary processes of changing an operation member from a separation location to an approaching location guided by a second conversion line having three connecting lines.
Figure 4B:
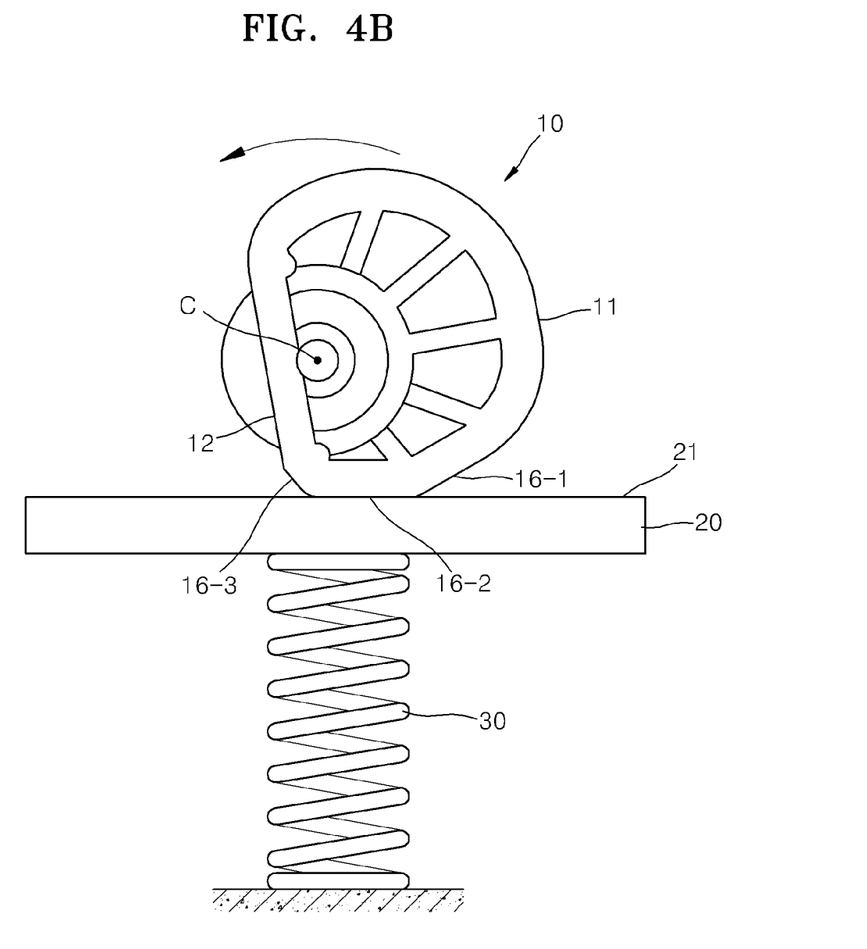
Figure 4C:
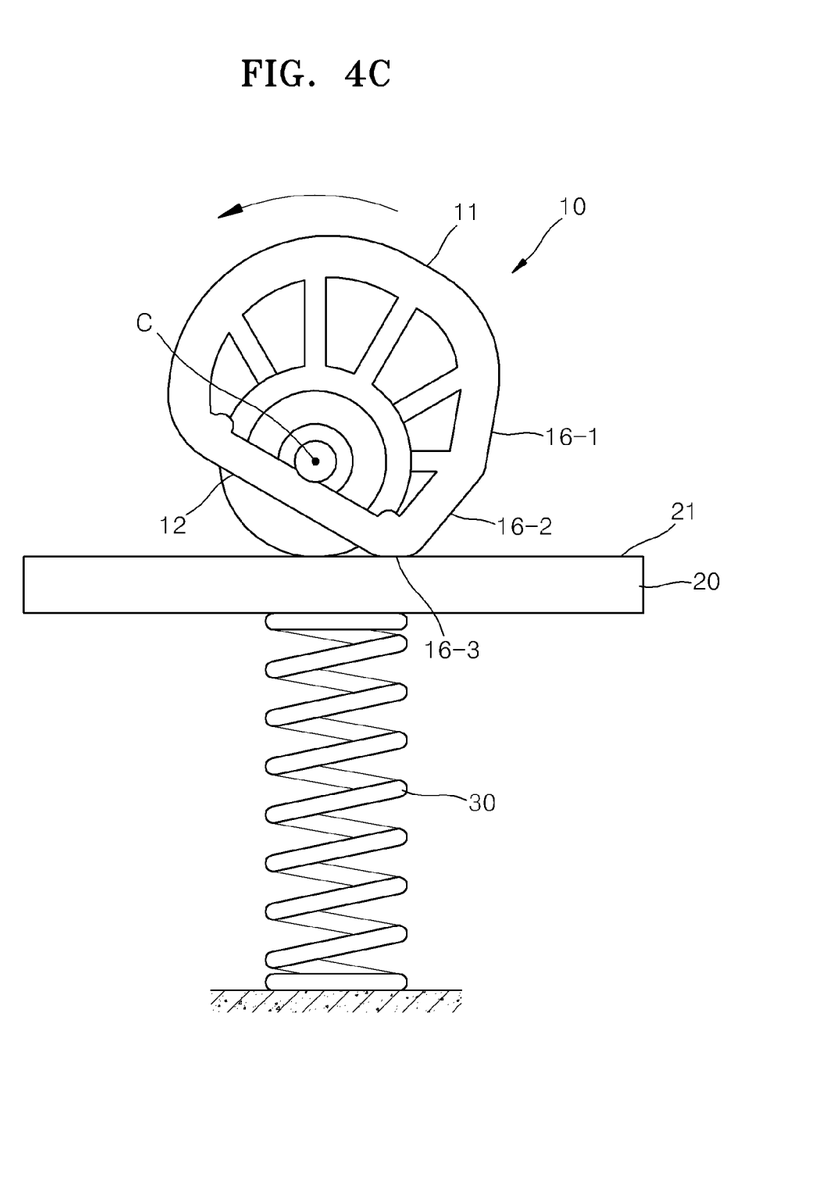

FIGS. 4A, 4B, and 4C sequentially illustrate exemplary processes of moving the operation member 20 from the separation location toward the approaching location. When the rotary cam 10 is rotated in a counter-clockwise direction in a state where the first cam line 11 contacts the contact portion 21 as illustrated in FIG. 1, the connection line 16-1 contacts the contact portion 21 first, as illustrated in FIG. 4A, the connection line 16-2 contacts the contact portion 21 as illustrated in FIG. 4B, and then, the connection line 16-3 contacts the contact portion 21, as illustrated in FIG. 4C. Then, when the second cam line 12 contacts the contact portion 21 or the operation member 20 contacts the stopper 40, the operation member 20 is located at the approaching location.

The shock force may be applied four times to the operation member 20. That is, the shock force is applied to the operation member 20 when the connection lines 16-1, 16-2, and 16-3 sequentially contact the contact portion 21 and when the second cam line 12 contacts the contact portion 21 or when the operation member 20 contacts the stopper 40. The shock force denotes a variation of the elastic force of the elastic member 30. For example, it may be assumed that the shock forces when the connection lines 16-1, 16-2, and 16-3 sequentially contact the contact portion 21 are respectively F1, F2, and F3, and the shock force when the second cam line 12 contacts the contact portion 21 or the operation member 20 contacts the stopper 40 is F4. If the elastic force of the elastic member 30 linearly changes with respect to the displacement of the elastic member 30 and the elastic coefficient is k, the largest values of F1, F2, F3, and F4 may be defined as the following equations:

$F1=k(d1-R1)$ $F2=k(R1-R2)$ $F3=k(R2-R3)$ $F4=k(R3-d2)$

Since d1>R1>R2>R3>d2, each of the values (d1−R1), (R1−R2), (R2−R3), and (R3−d2) is less than a value of (d1−d2). Thus, F1, F2, F3, and F4 are less than Fmax.

By forming the connection lines 16-1, 16-2, and 16-3 as straight line types in the second conversion line 16, the shock force may be dispersed a plurality of times to thereby reduce the maximum shock force applied to the rotary cam apparatus. As such, a possibility of damaging the rotary cam apparatus may be reduced, and a noise level is also reduced. In addition, the rotary cam 10 may be rotated at a high speed, and thus, an object may be driven at a high speed.

In FIGS. 1 through 3, the second conversion line 16 including the three connection lines 16-1, 16-2, and 16-3 is illustrated as an example; however, the present invention is not limited thereto. The second conversion line 16 may include only one connection line, or may include four or more connection lines, if necessary. The number of connection lines may be determined in consideration of the magnitude of the shock force, rigidity of the rotary cam apparatus, noise level, and rigidity of the object driven by the rotary cam apparatus.

The cam profile 10a may be configured by using lines, for example, the first and second cam lines 11 and 12, and the first and second conversion lines 13 and 16. However, as the lines denote projections of shapes of the cam profile 10a, the cam profile 10a is understood to not be one-dimensional. Therefore, a disclosure of a second cam line 12 and the connection lines 16-1, 16-2, and 16-3 as "straight lines" may be understood to denote that the projected shapes of the second cam line 12, and the connection lines 16-1, 16-2, and 16-3 are straight lines. Thus, a portion contacting the contact portion 21 of the operation member 20, for example, including the second cam line 12 and the connection lines 16-1, 16-2, and 16-3, may be planes or curved surfaces.

A rotary cam apparatus according to an exemplary embodiment of the present invention may be applied to various mechanical apparatuses. An electrophotographic image forming apparatus including the rotary cam apparatus is described.

Figure 5:
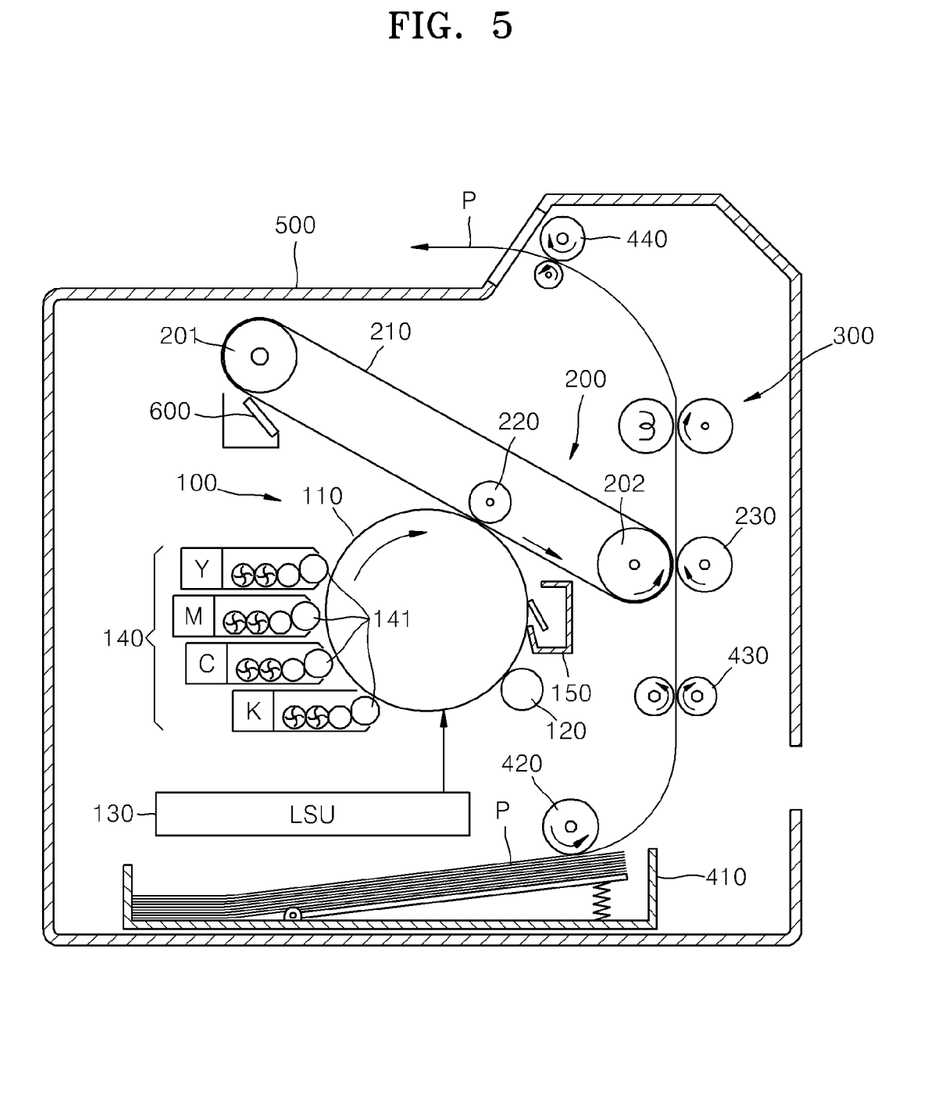
FIG. 5 illustrates an electrophotographic image forming apparatus according to an embodiment of the present invention.

FIG. 5 illustrates an electrophotographic image forming apparatus according to an embodiment of the present invention. The electrophotographic image forming apparatus may be a multi-path type color image forming apparatus. Referring to FIG. 5, the electrophotographic image forming apparatus includes an image forming unit 100 forming toner images by an electrophotographic method, a transfer unit 200 transferring the toner images onto a recording medium P via an intermediate transfer member 210, and a fusing unit 300 for fixing the toner images on the recording medium P by applying, for example, heat and pressure to the toner images.

The image forming unit 100 may include a photosensitive drum 110, a charger 120, an exposure unit 130, and a developer 140. The photosensitive drum 110 is an example of a photosensitive member on which electrostatic latent images are formed. The photosensitive drum 110 may be configured by forming a photosensitive layer on an outer circumference of a cylindrical core that is electrically conductive. The charger 120 charges an outer circumferential surface of the photosensitive drum 110 to a uniform potential. A charging roller that supplies electric charges to the outer circumferential surface of the photosensitive drum 110 while rotating in contact with or non-contact with the photosensitive drum 110 may be used as the charger 120. Otherwise, a corona discharger (not shown) may be used as the charger 120. The exposure unit 130 irradiates light corresponding to image information to the photosensitive drum 110 that is charged to the uniform potential so as to form an electrostatic latent image. A laser scanning unit (LSU) using a laser diode as a light source or a light-emitting diode (LED) exposure unit may be used as the exposure unit 130.

The image forming unit 100 according to an exemplary embodiment includes four developers 140Y, 140M, 140C, and 140K respectively containing developing agents of cyan (C), magenta (M), yellow (Y), and black (K) colors in order to print color images. The developing agents for printing color images are not limited to the above four examples, and a developing agent of white color or a developing agent of an intermediate color may be further disposed, if necessary. The number of developers may be increased. In a case of using a single-component developing method, the developing agent denotes a toner, and in a case of using a dual-component developing method, the developing agent includes a carrier and a toner. According to the dual-component developing method, a developing agent layer including the carrier and the toner is formed on an outer circumference of a developing roller that will be described below, and the toner in the developing agent layer is only developed by the photosensitive member. In addition, various developing methods such as a hybrid type that is a combination of the single-component developing method and the dual-component developing method may be used. Hereinafter, the developing agent will be referred to as a toner for convenience of description. In addition, if there is a need to distinguish the components according to colors, the references of colors, that is, Y, M, C, and K, are included in the reference numerals of the components.

Four developers 140Y, 140M, 140C, and 140K supply toners of Y, M, C, and K colors respectively to the electrostatic latent image formed on the photosensitive drum 110 to develop the electrostatic latent image. Each of the developers 140Y, 140M, 140C, and 140K includes a developing roller 141. Each of the developers 140Y, 140M, 140C, and 140K is located so that the developing roller 141 therein may be separated from the photosensitive drum 110 by as much as a developing gap. The developing gap may be tens to hundreds of μm. Although not illustrated in FIG. 5, each of the developers 140Y, 140M, 140C, and 140K may include an agitator for agitating the toner contained therein, a supply roller for supplying the toner to the developing roller 141, and a regulating member for regulating a thickness of a toner layer formed on an outer circumference of the developing roller 141.

In the multi-path type color image forming apparatus, the developers 140Y, 140M, 140C, and 140K operate sequentially one-by-one. A developing bias is applied to the developing roller 141 of a selected developer (for example, 140Y), and the developing bias is not applied to other developers (for example, 140M, 140C, and 140K) or an anti-developing bias for preventing the toner from being developed may be applied to the other developers. In addition, only the developing roller 141 of the selected developer (for example, 140Y) is rotated, and the developing rollers 141 of the other developers (for example, 140M, 140C, and 140K) may not be rotated.

The intermediate transfer member 210 may be formed as a belt supported by, for example, supporting rollers 201 and 202, and run at a linear velocity that is the same as that of the rotating photosensitive drum 110. A length of the intermediate transfer member 210 may be at least equal to or longer than a length of a recording medium P having a maximum size that may be used in the electrophotographic image forming apparatus. A first transfer roller 220 faces the photosensitive drum 110 with the intermediate transfer member 210 interposed therebetween, and a first transfer bias is applied for transferring the toner image developed on the photosensitive drum 110 to the intermediate transfer member 210. A second transfer roller 230 faces the intermediate transfer member 210. The second transfer roller 230 is separated from the intermediate transfer member 210 during transfer of the toner image from the photosensitive drum 110 to the intermediate transfer member 210, and may contact the intermediate transfer member 210 with a predetermined pressure when the toner image is completely transferred to the intermediate transfer member 210. A second transfer bias is applied to the second transfer roller 230 to transfer the toner image to the recording medium P. A cleaning unit 150 removes remaining toner on the photosensitive drum 110 after finishing the transfer. A corona transfer unit may be used instead of using the first and second transfer rollers 220 and 230.

An exemplary process of forming color images by using the above-described configuration is disclosed.

The surface of the photosensitive drum 110 may be charged to the uniform potential by the charger 120, and the exposure unit 130 irradiates light that is modulated according to image information of, for example, yellow (Y) color, to the photosensitive drum 110 to form an electrostatic latent image corresponding to the yellow (Y) color on the surface of the photosensitive drum 110. When the developing roller 141 of the developer 140Y is rotated and a developing bias is applied, a toner image of yellow color is formed on the photosensitive drum 110. The toner image of yellow (Y) color is transferred to the intermediate transfer member 110 by the first transfer bias applied to the first transfer roller 220.

When the toner images of the M, C, and K colors are sequentially transferred to the intermediate transfer member 210 from the photosensitive drum 110, a color toner image is formed on the surface of the intermediate transfer member 210. A recording medium P withdrawn from a feed cassette 410 by a pickup roller 420 is conveyed to a transfer region where the intermediate transfer member 210 and the second transfer roller 230 face each other by a feeding roller 430. The color toner image is transferred to the recording medium P in the transfer region. When the recording medium P passes through the fusing unit 300, the color toner image is fused on the recording medium P by heat and pressure. The recording medium P on which the fusing operation is finished is discharged to a discharge tray 500 by a discharging roller 440.

After transferring the image to the recording medium P in the transfer region, the toner remaining on the intermediate transfer member 210 should be removed. To do this, a cleaning member 600 may be disposed on an upper stream side of an intermediate transfer region where the photosensitive drum 110 and the first transfer roller 220 face each other. The cleaning member 600 may be, for example, a cleaning blade contacting the surface of the intermediate transfer member 210. The cleaning member 600 may be separated from the surface of the intermediate transfer member 210 while an image forming process is performed. For example, the cleaning member 600 may contact the intermediate transfer member 210 after the color toner image is transferred to the recording medium P and a rear portion of the color toner image passes through a cleaning region where the cleaning member 600 is disposed, and before a front portion of the color toner image reaches the cleaning region. The cleaning member 600 may be separated from the intermediate transfer member 210 before the toner image of a color that is firstly transferred to the intermediate transfer member 210 by the next image forming operation reaches the cleaning region. Therefore, a device for moving the cleaning member 600 to a cleaning location and an avoidance location is necessary.

Figure 6:
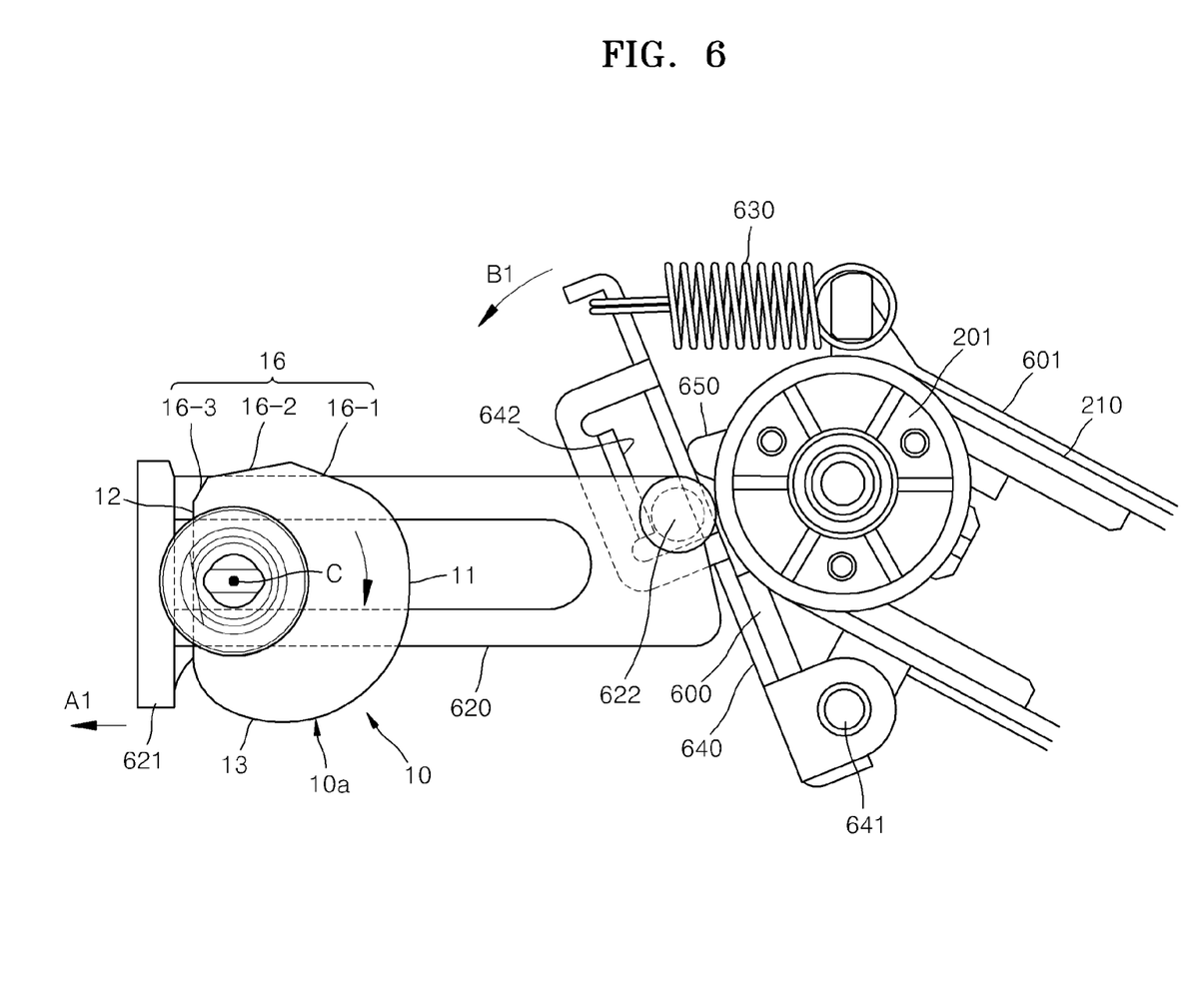
FIG. 6 illustrates an exemplary state where a cleaning member is located at a cleaning location.

The rotary cam apparatus may be used to contact/separate the cleaning member 600 on/from the intermediate transfer member 210. FIG. 6 illustrates shows an exemplary state where the cleaning member 600 contacts the intermediate transfer member 210, and FIG. 7 illustrates an exemplary state where the cleaning member 600 is separated from the intermediate transfer member 210.

The rotary cam 10 may have a structure that similar as that described with reference to FIGS. 1 through 4C. The first cam line 11 corresponds to the avoidance location, and the second cam line 12 corresponds to the cleaning location.

Figure 7:
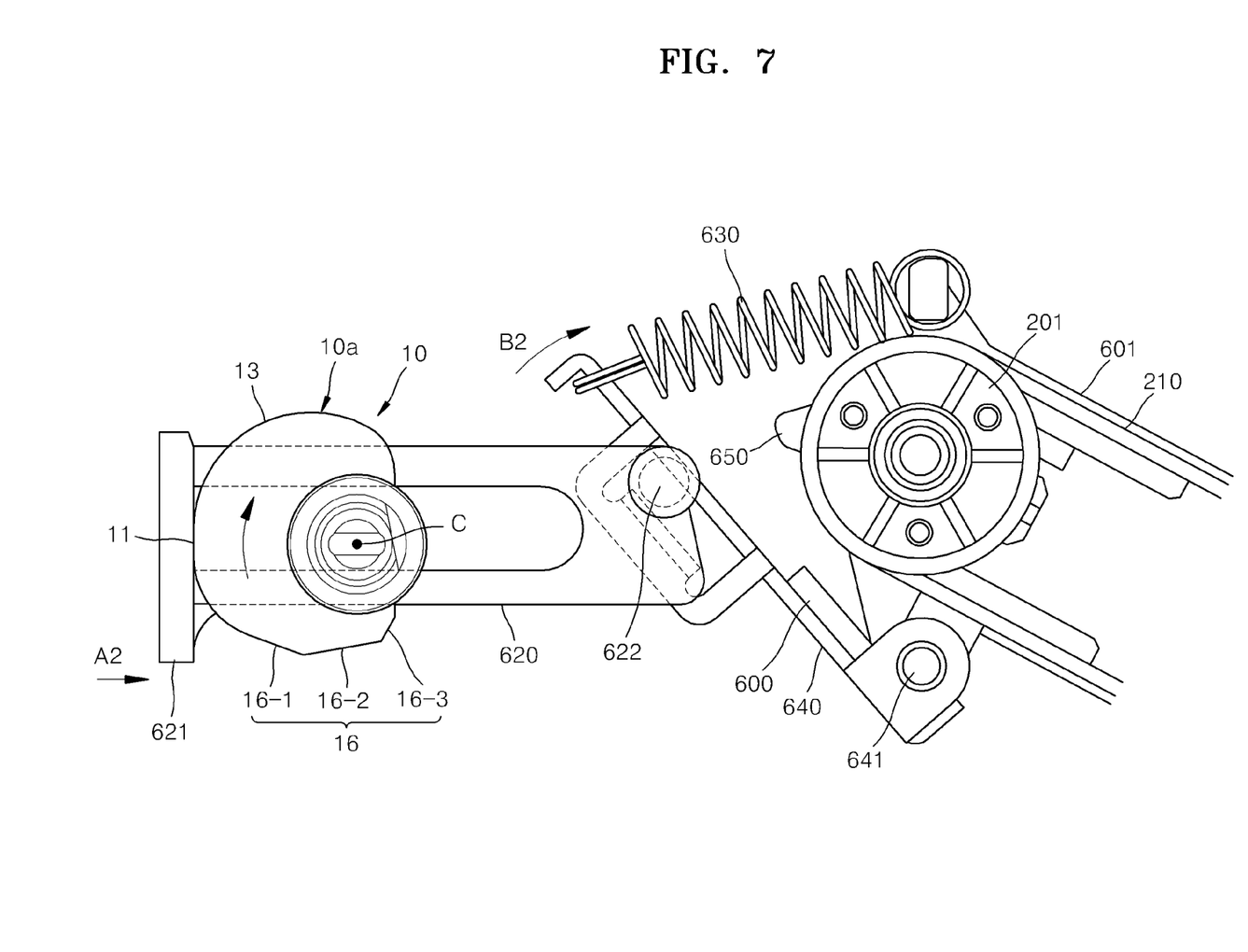
FIG. 7 illustrates an exemplary state where a cleaning member is located at an avoidance location.

Referring to FIGS. 6 and 7, the cleaning member 600 is installed on a supporting arm 640 that is rotatable based on a hinge 641. For example, the supporting arm 640 may be installed to be rotatable on a frame 601, on which the supporting roller 201 that supports the intermediate transfer member 210 is installed. An operation member 620 includes a contact portion 621 contacting a rotary cam 10. The operation member 620 is driven by the rotary cam 10 to rotate the supporting arm 640 so that the cleaning member 600 may be moved to the cleaning location and the avoidance location, where the cleaning member 600 contacts/is separated from the intermediate transfer member 210. To do this, for example, the operation member 620 may be connected to the supporting arm 640. For example, the operation member 620 may include a connection post 622, and the supporting arm 640 may include a guide 642 that is connected to the connection post 622.

An elastic member 630 applies an elastic force to the supporting arm 640 in a direction where the supporting arm 640 rotates toward the cleaning location. For example, the elastic member 630 may be a tensile coil spring having an end and the other end that are respectively connected to the supporting arm 640 and the frame 601. The operation member 620 may be connected to the supporting arm 640 via the connection post 622 and the guide 642. As such, the elastic member 630 applies the elastic force to the operation member 620 in a direction in which the operation member 620 approaches the rotary cam 10, that is, the operation member 620 contacts the cam profile 10a.

In an exemplary embodiment, a rotation of the supporting arm 640 to the cleaning location may be restricted by a stopper 650 formed on the frame 601, and accordingly, movement of the operation member 620 is also restricted. Therefore, as illustrated in FIG. 6, the operation member 620 is stopped by the stopper 650 before contacting the second cam line 12 in the cleaning region. Although not shown in the drawings, if there is no stopper 650, the rotation of the supporting arm 640 and the movement of the operation member 620 may be restricted when the cleaning member 600 contacts the intermediate transfer member 210.

In a state illustrated in FIG. 6, when the rotary cam 10 is rotated in a clockwise direction, the first conversion line 13 contacts the contact portion 621, and the operation member 620 gradually moves in an A1 direction illustrated in FIG. 6 against the elastic force of the elastic member 630, and the supporting member 600 is rotated in a B1 direction. When the contact portion 621 contacts the second cam line 12, as illustrated in FIG. 7, the supporting arm 640 reaches the avoidance location where the cleaning member 600 is separated from the intermediate transfer member 210.

In a state illustrated in FIG. 7, when the rotary cam 10 is rotated in a clockwise direction, the second conversion line 16 contacts the contact portion 621, and the operation member 620 is allowed to move in the direction in which the elastic force is applied. The connection portions 16-1, 16-2, and 16-3 sequentially contact the contact portion 621. The operation member 620 is moved in an A2 direction by the elastic force of the elastic member 630, and the supporting arm 640 is moved in a B2 direction so that the cleaning member 600 approaches the intermediate transfer member 210. In this process, the above-described shock force F1, F2, and F3 are sequentially applied to the operation member 620. The shock force is transferred to the supporting arm 640 and the frame 601 supporting the supporting arm 640 via the operation member 620. The cleaning member 600 contacts the intermediate transfer member 210 and the supporting arm 640 contacts the stopper 650 before the second cam line 12 contacts the contact portion 621, and thus, the movements of the operation member 620 and the rotation of the supporting arm 640 are stopped. Since the rotation of the supporting arm 640 is restricted by the stopper 650, the shock force applied to the stopper 650 at the instant when the supporting arm 640 contacts the stopper 650 is less than the shock force F4. Since the shock force F1, F2, F3, and F4 is less than the maximum shock force Fmax e.g., n a case where the curve 14 of FIG. 1 is used instead of the second conversion line 16, the risk of damaging the operation member 620, the supporting arm 640, and the frame 601 may be reduced, and the noise level may be reduced. Since the rotary cam 10 rotates at a high speed, the cleaning member 600 may contact/be separated from the intermediate transfer member 210 within a short time period, and thus, a technological advantage of the present invention is forming an image forming apparatus operable at a high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image forming apparatus for printing images on a recording medium, the apparatus comprising:
   a transfer unit for transferring a toner image to the recording medium via an intermediate transfer member; and
   a rotary cam apparatus for moving a cleaning member that removes waste toner on the intermediate transfer member to a cleaning location and an avoidance location, where the cleaning member contacts/is separated from the intermediate transfer member,
   wherein the rotary cam apparatus comprises:
      an operation member including a contact portion;
      a rotary cam including a cam profile contacting the contact portion of the operation member to move the operation member; and
      an elastic member applying an elastic force to the operation member in a direction in which the contact portion contacts the cam profile,
   wherein the cam profile comprises:
      a first cam line separated by a first distance from a rotating center of the rotary cam;
      a second cam line separated by a second distance that is shorter than the first distance from the rotating center;
      a first conversion line that is connected to the first cam line from the second cam line; and
      a second conversion line that is connected to the second cam line from the first cam line, and comprising a plurality of straight connection lines, which are separated by a distance that is greater than the second distance and less than the first distance from the rotating center; and
   a stopper to stop the operation member to prevent the contact portion from contacting the second cam line.

2. The apparatus of claim 1, wherein the second cam line is a straight line.

3. The apparatus of claim 1, wherein the first conversion line allows the operation member to move in a direction opposite to the elastic force and the second conversion line allows the operation member to move in a direction in which the elastic force is applied.

4. The apparatus of claim 3, further comprising:
a supporting arm supporting the cleaning member and moving to the cleaning location and the avoidance location,
wherein the operation member is connected to the supporting arm.

5. The apparatus of claim 1, wherein the stopper is disposed on a frame on which the intermediate transfer member is supported.

6. The apparatus of claim 5, further comprising:
a supporting arm for supporting the cleaning member and installed on the frame to be movable to the cleaning location and the avoidance location,
wherein the operation member is connected to the supporting arm, and the stopper contacts the supporting arm to stop the operation member.

7. The apparatus of claim 1, wherein if there is a plurality of the connection lines, distances from the rotating center to the connection lines decrease from the first cam line toward the second cam line.

8. The apparatus of claim 1, wherein the first conversion line is a curve.

* * * * *